(12) United States Patent
Garceau

(10) Patent No.: US 8,052,125 B2
(45) Date of Patent: *Nov. 8, 2011

(54) MOTOR DRIVE FOR A CAMPER JACK

(75) Inventor: Bernard F. Garceau, Vandalia, MI (US)

(73) Assignee: Norco Industries, Inc., Compton, CA (US)

( * ) Notice: Subject to any disclaimer, the term of this patent is extended or adjusted under 35 U.S.C. 154(b) by 806 days.

This patent is subject to a terminal disclaimer.

(21) Appl. No.: 12/028,323

(22) Filed: Feb. 8, 2008

(65) Prior Publication Data

US 2008/0149904 A1 Jun. 26, 2008

Related U.S. Application Data

(63) Continuation of application No. 11/164,440, filed on Nov. 22, 2005, now Pat. No. 7,328,884.

(51) Int. Cl.
*B60S 9/02* (2006.01)

(52) U.S. Cl. .......... 254/418; 254/97; 254/103; 254/425; 254/419

(58) Field of Classification Search .................. 254/126, 254/122–125, 93 R, 89 H, 418–425, 103, 254/97

See application file for complete search history.

(56) References Cited

U.S. PATENT DOCUMENTS

| | | | | |
|---|---|---|---|---|
| 3,592,443 A | * | 7/1971 | Budrow et al. | 254/420 |
| 4,067,543 A | * | 1/1978 | Orth et al. | 254/425 |
| 4,103,869 A | * | 8/1978 | Mesny et al. | 254/425 |
| 4,635,904 A | * | 1/1987 | Whittingham | 254/425 |
| 4,784,400 A | * | 11/1988 | Hofius | 254/93 VA |
| 4,941,797 A | * | 7/1990 | Smillie, III | 414/462 |
| D327,969 S | * | 7/1992 | Budrow et al. | D34/31 |
| 5,273,256 A | * | 12/1993 | Chambers | 254/45 |
| 5,553,825 A | * | 9/1996 | Rasmussen | 248/354.3 |
| 5,755,293 A | * | 5/1998 | Bourke | 173/29 |
| 5,826,889 A | * | 10/1998 | Eden | 280/6.153 |
| 5,984,353 A | * | 11/1999 | Rasmussen | 280/766.1 |
| 6,592,163 B1 | * | 7/2003 | Nebel | 296/26.01 |
| 6,695,289 B1 | * | 2/2004 | Mickael | 254/122 |
| 6,722,635 B2 | * | 4/2004 | Erickson | 254/103 |
| 6,840,541 B2 | * | 1/2005 | Walters | 280/763.1 |
| 2004/0099853 A1 | * | 5/2004 | Verakis | 254/343 |
| 2005/0284265 A1 | * | 12/2005 | Baker | 81/57.39 |
| 2008/0149904 A1 | * | 6/2008 | Garceau | 254/103 |

OTHER PUBLICATIONS

"H&H Super Power Jack Model #12250, Owner's Instructions", H&H Engineering (Battle Creek, MI), pp. 1-4, (1996).

"Hi-Power, 2,500 Acme Jack, Owner's Instructions (P/N 27448, 27450)", H&H Engineering (Battle Creek, MI), pp. 1-4, (1989).

"Hi-Power, 3,000 Acme Jack, Owner's Instructions (P/N 27265, 27295, 27300)", H&H Engineering (Battle Creek, MI), pp. 1-5, (1989).

"Owner's Manual PowerPac Installation & Operating Instructions", H&H Engineering (Battle Creek, MI), pp. 1-3, (1997).

"Take the back-breaking work out of changing a flat . . . lift your vehicle at the touch of a button!".

* cited by examiner

*Primary Examiner* — Lee D Wilson

(74) *Attorney, Agent, or Firm* — Hahn Loeser & Parks LLP

(57) ABSTRACT

A motor drive for camper jacks or screw jacks that rapidly operates the screw jack between a retracted position and an extended no load position. A manual operator then operates the screw jack between the extended no load position and an extended loaded position. The motor drive and manual operator share a right angle gear mechanism.

20 Claims, 8 Drawing Sheets

MOTOR DRIVE FOR A CAMPER JACK

BACKGROUND OF THE INVENTION

This invention relates generally to a screw jack for recreational vehicles and more particularly to motor operator for a screw jack for recreational vehicles.

Recreation vehicles, such as motor homes, travel trailers, campers, etc., are preferably leveled and stabilized when parked for convenience and comfort. Stabilizing the RV reduces vibration and bouncing upon movement inside. Prior art screw jacks can be slow to operate between a retracted or travel position and an extended position where the screw jack can be loaded to level and stabilize the recreational vehicle.

The foregoing illustrates limitations known to exist in present screw jacks. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a drive for a screw jack comprising: a motor having an axis of rotation; and a gear mechanism having a shaft therein, an end of the shaft having a hex head thereon, an opposite end of the shaft having a hex socket therein, the hex socket having a complementary shape and size to the hex head.

In a second aspect of the present invention, this is accomplished by providing a drive for a screw jack, the screw jack having a drive screw rotating about an axis, the drive comprising: a motor having an axis of rotation; and a right angle gear mechanism having: a worm gear attached to the motor, the worm gear rotating about the motor axis of rotation; a spur gear mounted on a shaft, the spur gear engaging the worm gear, the shaft having an axis extending at a right angle to the motor axis of rotation, wherein the spur gear shaft is coaxial with the drive screw axis of rotation.

In a further aspect of the present invention, this is accomplished by providing in combination: a screw jack including an elongated drive screw rotating about an axis; and a drive apparatus operating the screw jack, the drive apparatus comprising: a motor having an axis of rotation; and a right angle gear mechanism having: a worm gear attached to the motor, the worm gear rotating about the motor axis of rotation; a spur gear mounted on a shaft, the spur gear engaging the worm gear, the elongated drive screw axis extending at a right angle to the motor axis of rotation.

In a further aspect of the present invention, this is accomplished by providing a screw jack comprising: means for rapid translation of the screw jack between a retracted position and an extended no load position, the means for rapid translation of the screw jack comprising an electric motor; and means for further translation of the screw jack between the extended no load position and an extended loaded position, the means for further translation of the screw jack comprising a manual operator.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
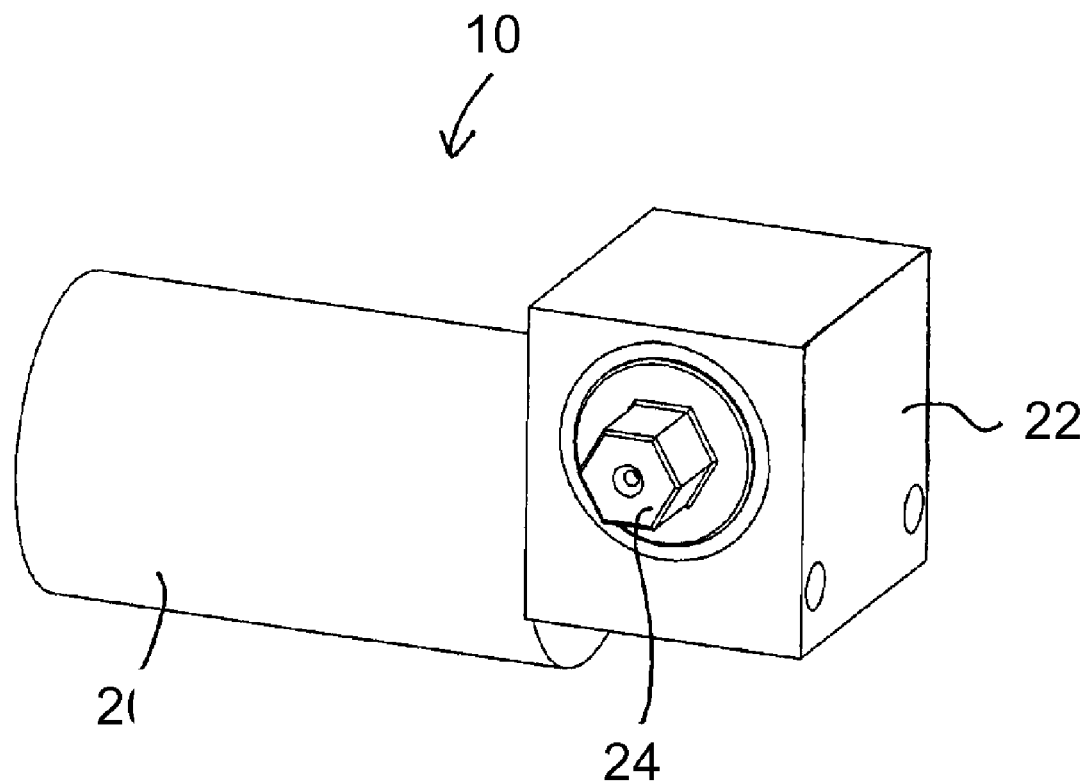
FIG. 1 is a perspective view of a drive for use with a screw jack according to the present invention.
Figure 2:
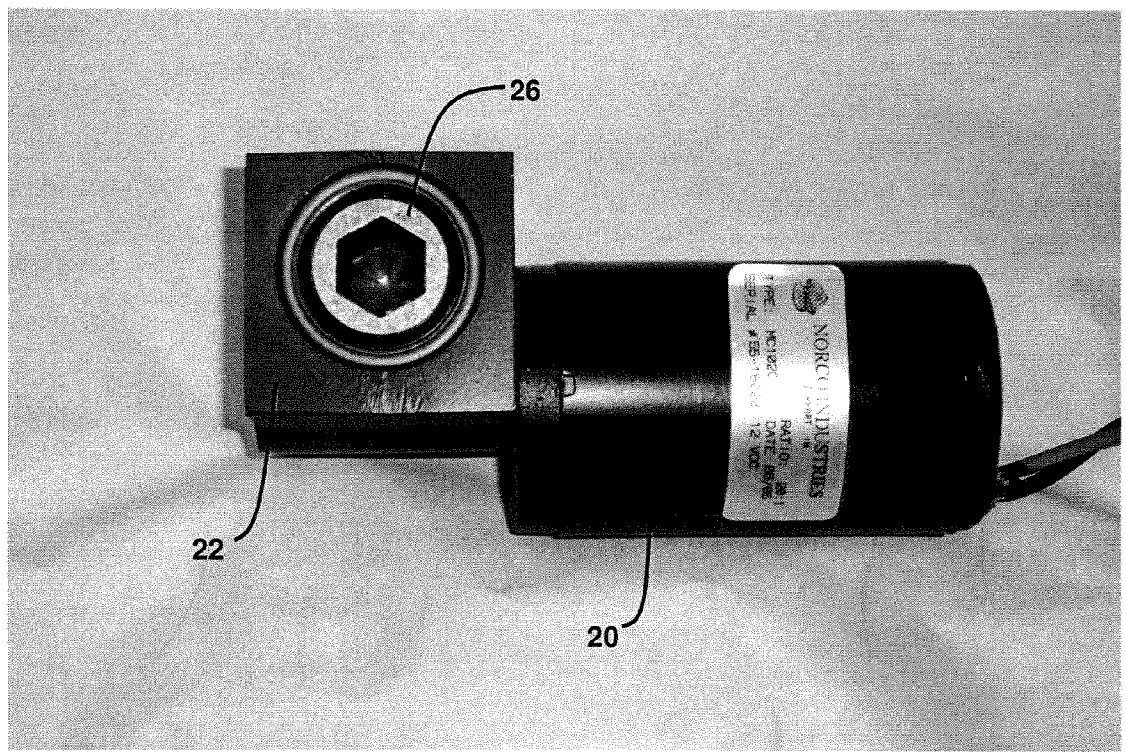
FIG. 2 is second perspective view of the drive shown in FIG. 1.
Figure 4:
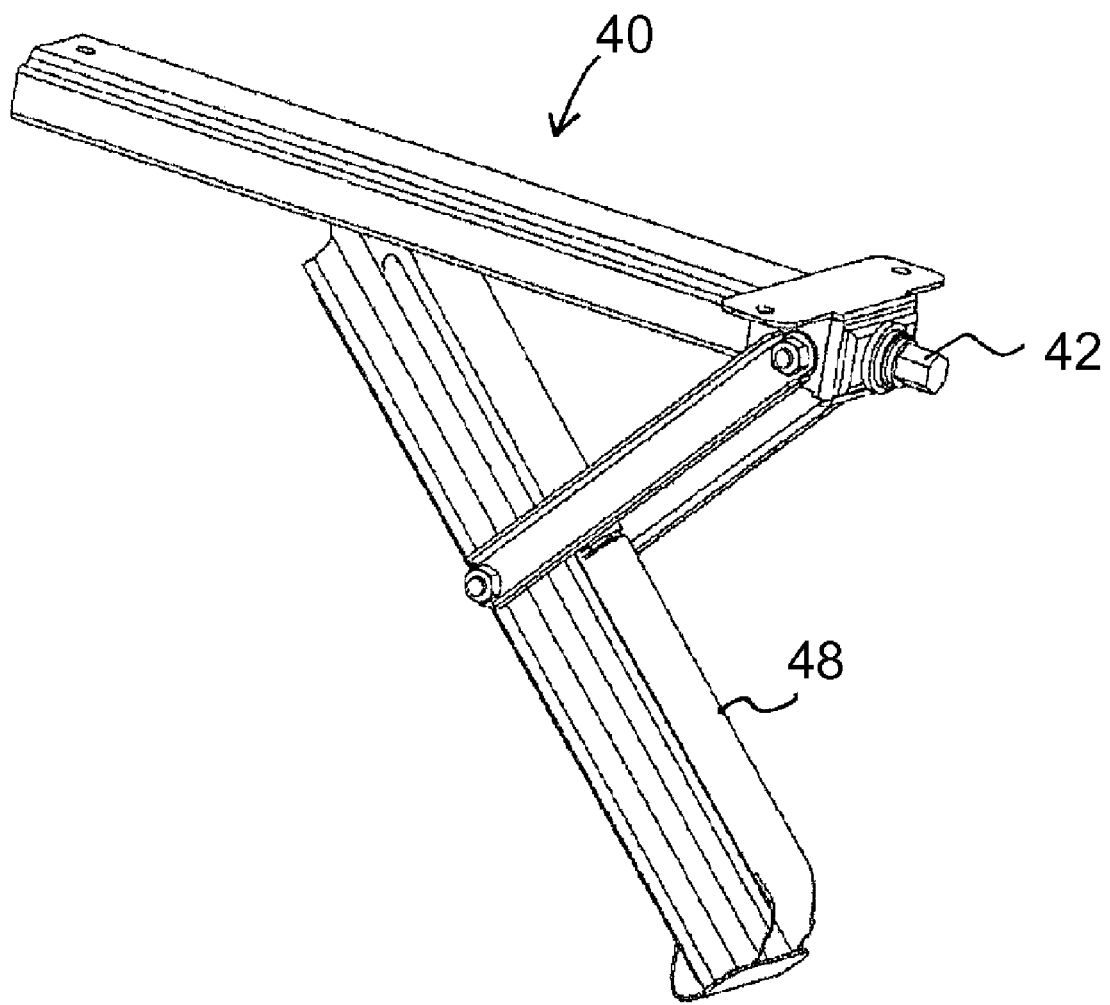
FIG. 4 is a perspective view of the stabilizing jack shown in FIG. 3.
Figure 6:
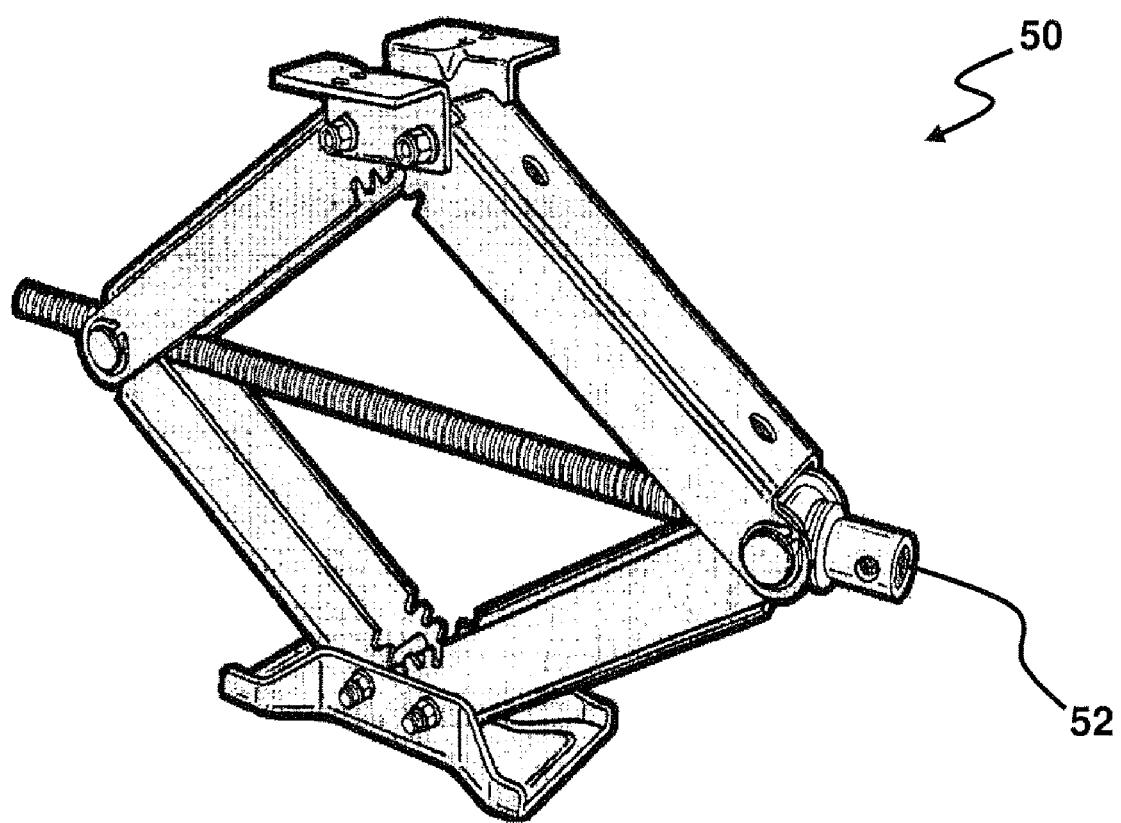
FIG. 6 is a perspective view of the leveling scissors jack shown in FIG. 3.

FIG. 1 illustrates a jack power drive 10 for power operation of a screw jack or camper jack such as the stabilizing jack 40 shown in FIG. 4 or the leveling scissors jack 50 shown in FIG. 6. Drive 10 comprises a motor 20 connected to a gear assembly 22. Preferably, gear assembly 22 is a right angle gear assembly. The motor 20 includes a armature shaft (not shown) that extends into the right angle gear assembly 22. A worm gear 28 (see FIG. 7) fits on the end of the motor armature shaft.

Figure 7:
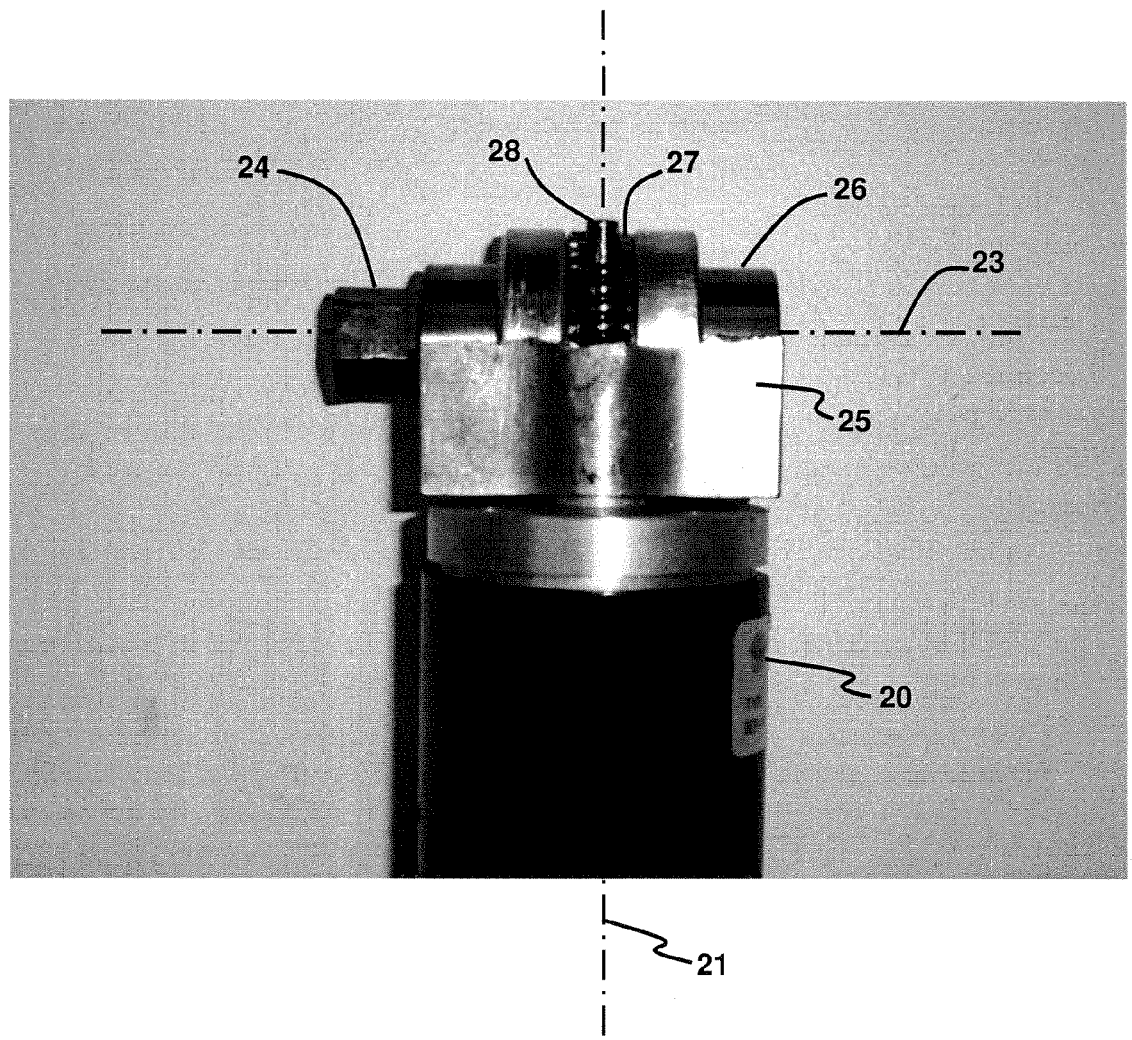
FIG. 7 is a plan view of the drive shown in FIG. 1, with a portion of the gear housing removed.
Figure 8:
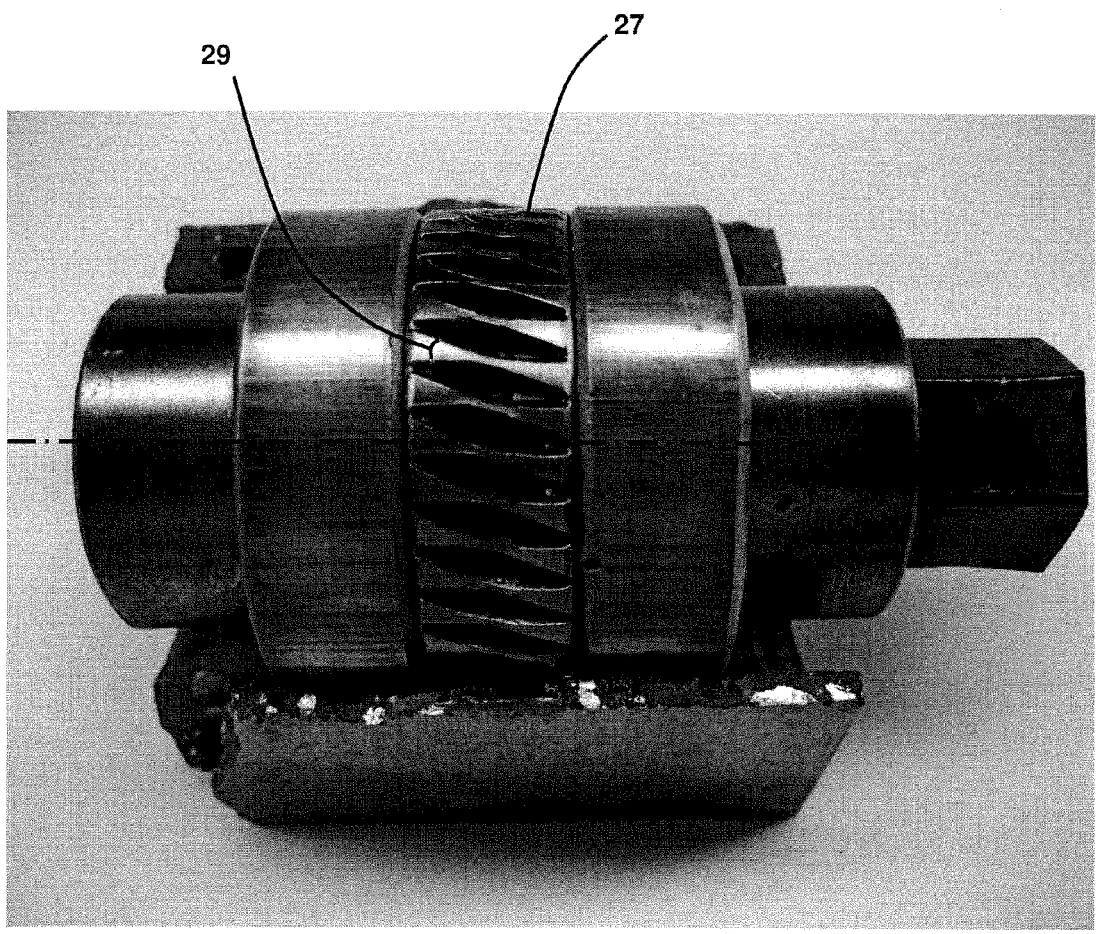
FIG. 8 is a plan view of the drive gear mechanism shown in FIG. 1, with a portion of the gear housing removed.

As shown in FIGS. 7 and 8, the right angle gear assembly 22 includes a housing 25 that is attached to the motor 20. A spur gear shaft (not numbered) is rotatably supported within the housing 25. The spur gear shaft has a centerline 23 that extends at a right angle to a centerline 21 of the motor. A spur gear 27 is mounted on the spur gear shaft and engages the motor worm gear 28. One end of the spur gear shaft terminates in a hex head 24 and the other end of the spur gear shaft terminates in a hex socket 26. Hex socket 26 has a complementary shape and size to hex head 24.

Figure 3:
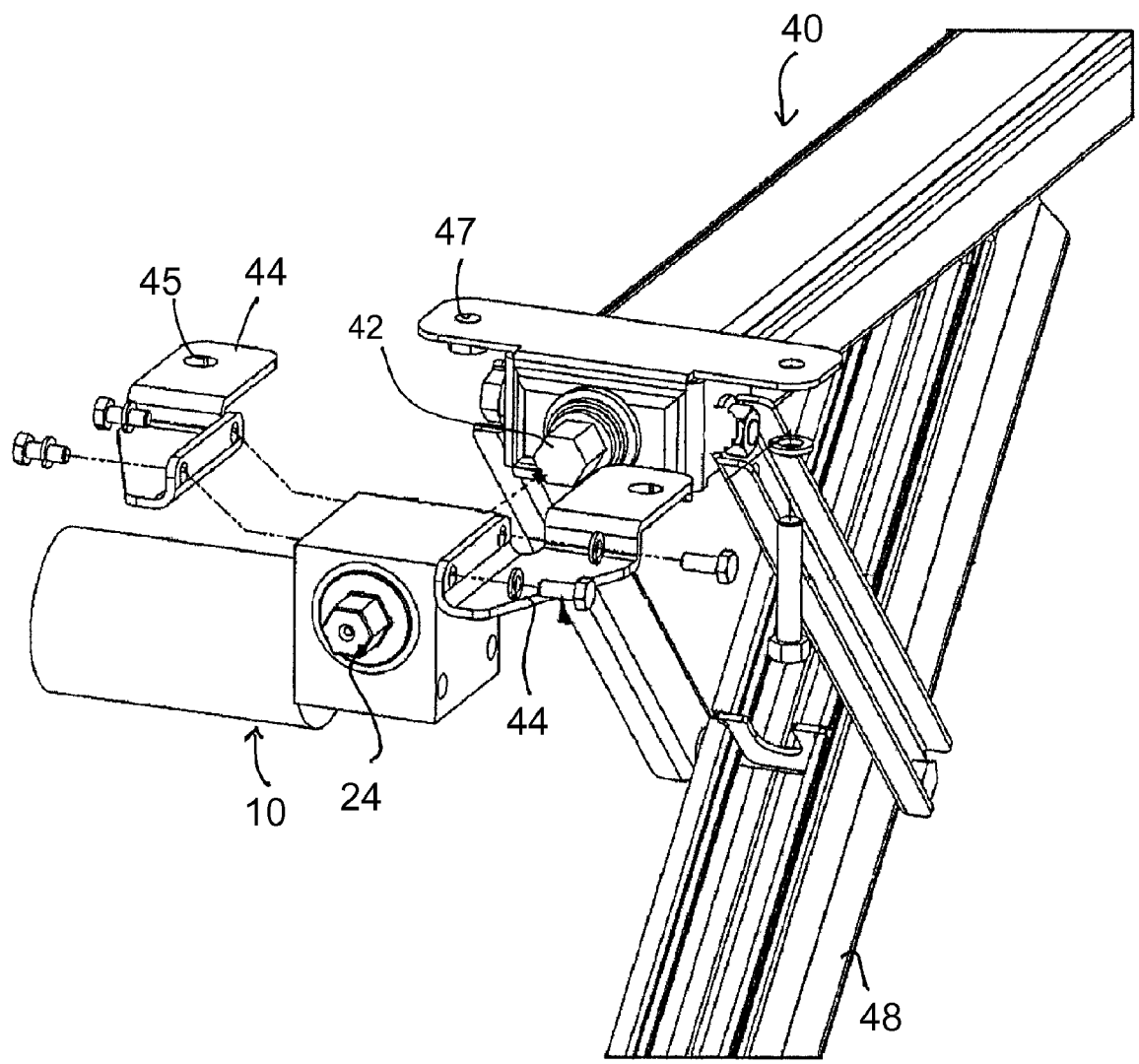
FIG. 3 is a perspective view of the drive shown in FIG. 1 and a screw drive stabilizing jack.

Drive 10 is intended to work with many types of screw jacks, i.e., jacks that use an elongated threaded drive rod. One type of screw jack 40, a stabilizing jack, is shown in FIGS. 3 and 4. Stabilizing jack 40 is operated by rotating an elongated threaded screw (not shown) to extend a leg 48. The elongated threaded screw terminates in a hex head 42. The jack hex head 42 has a shape and size that is complementary to drive hex socket 26. Drive 10 is attached to stabilizing jack 40 by fitting stabilizing jack hex head 42 into drive hex socket 26. Brackets 44 are attached to drive 10 and stabilizing jack 40. Screws fit through mounting holes 45 in bracket 44 and mounting holes 47 in stabilizing jack 40 to attached the drive 10 to the stabilizing jack 40 and to the recreational vehicle.

In operation, motor 20 is rotated in a first direction, which via the right angle gear assembly 22, rotates hex head 42 and the elongated threaded screw in a first direction causing leg 48 to extend from a recessed position (not shown) to an extended position. Motor 20 is operated until leg 48 contacts the ground and begins to pick up load. In a preferred embodiment, motor 20 is not large enough to continue to operate jack 40 once load is picked up by jack 40. To continue to operate jack 40 to pick up load and stabilize the recreational vehicle, drive hex head 24 is manually operated to continue to rotate the right angle gear shaft and the elongated jack threaded drive shaft to which drive 10 is attached by drive hex socket 26. Any appropriate operator, such as a socket wrench, a box wrench, an adjustable wrench, crank handle, etc., can be used to engage drive hex head 24 and to manually operate drive 10.

In a preferred embodiment, the teeth on spur gear 27 extend at an angle 29 to the spur gear center line 23. Angle 29 is large enough to allow back driving of motor 20. This facilitates the manual operation of the drive 10 without impeding the operation of motor 20.

To lower the recreational vehicle and retract jack 40 to the recessed position, the above operation is reversed. Drive hex head 24 is manually operated to lower the recreation vehicle until the load on the jack 40 is reduced. Then, motor 20 is operated to fully retract jack 40 to the recessed position.

Figure 5:
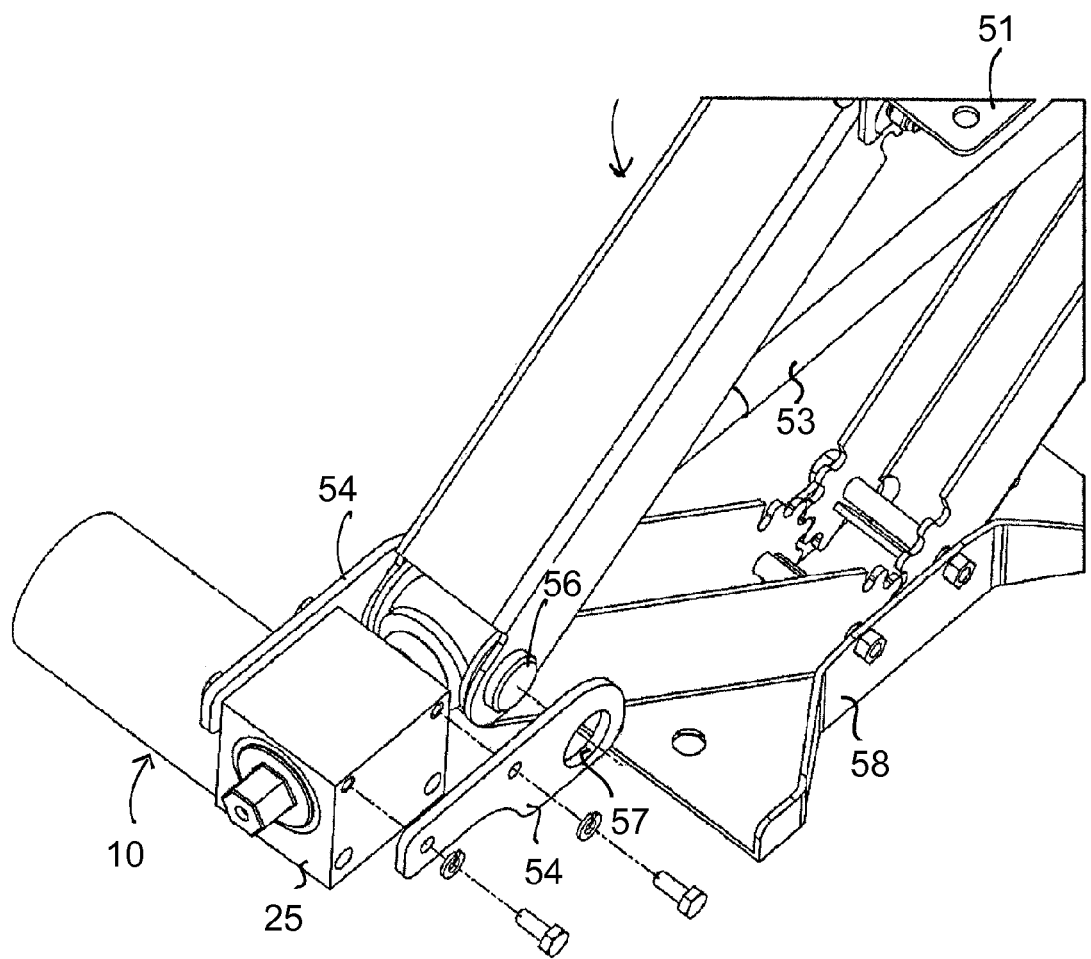
FIG. 5 is a perspective view of the drive shown in FIG. 1 and a screw drive leveling scissors jack.

One second type of screw jack 50, a leveling scissors jack, is shown in FIGS. 5 and 6. Leveling scissors jack 50 is operated by rotating an elongated threaded screw 53 to raise a lift platform 51. The elongated threaded screw 53 terminates in a hex head 52. The jack hex head 52 has a shape and size that is complementary to drive hex socket 26. Drive 10 is attached to leveling scissors jack 50 by fitting scissors jack hex head 52 into drive hex socket 26. Brackets 54 are attached to drive 10 and leveling scissors jack 50. The leveling scissors jack 50 is attached to the recreational vehicle by bolting the lift platform 51 to the recreational vehicle. Apertures 57 in mounting brackets 54 fit about the ends 56 of a scissors jack trunnion and the mounting brackets 54 are secured to the right angle gear housing 25.

In operation, motor 20 is rotated in a first direction, which via the right angle gear assembly 22, rotates hex head 52 and the elongated threaded screw 53 in a first direction causing the leveling scissors jack 50 to extend from a retracted position (not shown) to an extended position. Motor 20 is operated until foot 58 contacts the ground and the jack 50 begins to pick up load. In a preferred embodiment, motor 20 is not large enough to continue to operate jack 50 once load is picked up by jack 50. To continue to operate jack 50 to pick up load and level the recreational vehicle, drive hex head 24 is manually operated to continue to rotate the right angle gear shaft and the elongated jack threaded drive shaft to which drive 10 is attached by drive hex socket 26. Any appropriate operator, such as a socket wrench, a box wrench, an adjustable wrench, crank handle, etc. can be used to engage drive hex head 24 and to manually operate drive 10.

To lower the recreational vehicle and retract jack 50 to the retracted position, the above operation is reversed. Drive hex head 24 is manually operated to lower the recreation vehicle until the load on the jack 50 is reduced. Then, motor 20 is operated to fully retract jack 50 to the retracted or recessed position.

In a further aspect, the present invention comprises a means for rapidly translating the jack 40, 50 between the retracted position to an extended no load position and a means for further translating the jack 40, 50 to an extended loaded position. The means for rapidly translating the jack to the extended no load position comprises the motor 20, right angle gear mechanism 22 and the jack threaded screw 53. The means for further translating the jack to the extended loaded position comprises the right angle gear assembly 22, the jack threaded screw 53 and the manual operator attached to the drive hex head 24.

Having described the invention, what is claimed is:

1. An assembly comprising:
    a drive including a motor having an axis of rotation, and a gear mechanism having a shaft therein, an end of the shaft having a head thereon, an opposite end of the shaft having a socket therein, the socket having a complementary shape and size to the head,
    wherein the gear mechanism is a right angle gear mechanism having a worm gear attached to the motor, the worm gear rotating about the motor axis of rotation; and a spur gear mounted on a shaft, the spur gear engaging the worm gear, the shaft having an axis extending at a right angle to the motor axis of rotation, wherein the teeth on the spur gear are at an angle large enough to permit back driving of the motor;
    a screw jack including an elongated drive screw rotatable about an axis, the drive screw having a head on one end thereof that is complementary to the socket of the gear mechanism; and
    at least one bracket attached to the drive and to the screw jack.

2. The assembly according to claim 1, wherein the at least one bracket is planar.

3. The assembly according to claim 1, wherein the at least one bracket is attached to the drive along a first planar surface and attached to the screw jack along a second planar surface.

4. The assembly according to claim 3, wherein the first planar surface and the second planar surface are parallel.

5. The assembly according to claim 3, wherein the first planar surface and the second planar surface are perpendicular.

6. The assembly according to claim 1 further comprising a recreational vehicle lift platform attached to the screw jack.

7. The assembly according to claim 1, wherein the at least one bracket includes at least two apertures.

8. The assembly according to claim 1, where the head is a hex head and the socket is a hex socket.

9. A vehicle assembly comprising:
    at least one drive including a motor having an axis of rotation, and a gear mechanism having a shaft therein, an end of the shaft having a head thereon, an opposite end of the shaft having a socket therein, the socket having a complementary shape and size to the head,
    wherein the gear mechanism is a right angle gear mechanism having a worm gear attached to the motor, the worm gear rotating about the motor axis of rotation; and a spur gear mounted on a shaft, the spur gear engaging the worm gear, the shaft having an axis extending at a right angle to the motor axis of rotation, wherein the teeth on the spur gear are at an angle large enough to permit back driving of the motor;
    at least one screw jack including a lift platform and an elongated drive screw rotatable about an axis, the drive screw having a head on one end thereof that is complementary to the socket of the gear mechanism;
    at least one bracket, wherein the at least one bracket is configured to attach the at least one drive and the at least one screw jack; and
    a recreational vehicle connected to the lift platform of the at least one screw jack.

10. The vehicle assembly according to claim 9, wherein the at least one screw jack is a a leveling scissors jack.

11. The vehicle assembly according to claim 9, wherein the at least one screw jack is a stabilizing jack.

12. The vehicle assembly according to claim 9, wherein the at least one bracket is planar.

13. The vehicle assembly according to claim 9, wherein the at least one bracket is attached to the at least one drive along a first planar surface and attached to the at least one screw jack along a second planar surface.

14. The vehicle assembly according to claim 9 further comprising at least one lift platform attached to the at least one screw jack, wherein the at least one lift platform is connected to a recreational vehicle.

15. The vehicle assembly according to claim 14, wherein the at least one lift platform is bolted to the recreational vehicle.

16. The vehicle assembly according to claim 9, wherein the head is a hex head and the socket is a hex socket.

17. An assembly comprising:

means for rapid translation of a screw jack between a retracted position and an extended no load position, the means for rapid translation of the screw jack comprising an electric motor;

means for further translation of the screw jack between the extended no load position and an extended loaded position and subsequent translation of the screw jack between the extended loaded position and the extended no load position, the means for further translation of the screw jack comprising a manual operator; and means for rapid translation of the screw jack between the extended no load position and the retracted position, the means for rapid translation of the screw jack comprising the electric motor.

18. The assembly according to claim 17, wherein the screw jack is a leveling scissors jack.

19. The vehicle assembly according to claim 17, wherein the screw jack is a stabilizing jack.

20. The vehicle assembly according to claim 17, wherein the means for rapid translation of the screw jack and the means for further translation comprises a shared right angle gear mechanism.

* * * * *